United States Patent [19]
von Harpe

[11] Patent Number: 5,728,357
[45] Date of Patent: Mar. 17, 1998

[54] REDUCTION OF $NO_x$ EMISSIONS FROM ROTARY CEMENT KILNS BY SELECTIVE NONCATALYTIC REDUCTION

[75] Inventor: Thure von Harpe, Meerbusch, Germany

[73] Assignee: Nalco Fuel Tech, Naperville, Ill.

[21] Appl. No.: 628,539

[22] Filed: Apr. 10, 1996

[51] Int. Cl.⁶ .................................................. B01J 8/00
[52] U.S. Cl. .................................................. 423/239.1
[58] Field of Search ............................. 423/239.1, 235

[56] References Cited

U.S. PATENT DOCUMENTS

| | | | |
|---|---|---|---|
| 3,900,554 | 8/1975 | Lyon | 423/235 |
| 4,080,218 | 3/1978 | Mori et al. | 423/239.1 |
| 4,154,803 | 5/1979 | Uchikawa et al. | 423/239.1 |
| 4,208,386 | 6/1980 | Arand et al. | 423/235 |
| 4,325,924 | 4/1982 | Arand et al. | 423/235 |
| 4,719,092 | 1/1988 | Bowers | 423/235 |
| 4,842,834 | 6/1989 | Burton | 423/235 |
| 4,915,036 | 4/1990 | DeVita | 110/215 |
| 4,992,249 | 2/1991 | Bowers | 423/235 |

FOREIGN PATENT DOCUMENTS

| | | | |
|---|---|---|---|
| 0 615 777 A1 | 9/1994 | European Pat. Off. | 423/239.1 |
| 9117814 | 11/1991 | WIPO . | |

*Primary Examiner*—Michael Lewis
*Assistant Examiner*—Thomas G. Dunn, Jr.
*Attorney, Agent, or Firm*—St. Onge Steward Johnston & Reens LLC

[57] ABSTRACT

The use of urea injection SNCR is enabled for rotary kilns of the type used to produce cement clinker. Rotary kilns are long cylinders that rotate about an inclined axis, with cement premix fed in at one end and a burner for heat at the other end. The geometry of the kilns and temperatures at the ends make introduction of ammonia or urea solutions ineffective or totally impractical. Urea prills can be injected at an initial velocity of at least 25, typically greater than 100, meters per second to reach into the kiln where a suitable temperature window for $NO_x$ reduction can be found.

4 Claims, 1 Drawing Sheet

REDUCTION OF NO$_x$ EMISSIONS FROM ROTARY CEMENT KILNS BY SELECTIVE NONCATALYTIC REDUCTION

TECHNICAL FIELD

The invention relates to reducing the environmental damage caused by NO$_x$ generated during cement production in rotary kilns, by enabling the use of selective noncatalytic reduction (SNCR) in the gas phase.

Cement is formed in rotary kilns by heating limestone and clay or other suitable silicious material at very high temperatures (e.g., 1700° C. and higher). At these high temperatures, nitrogen oxides (NO$_x$) formation is greatly increased because the conditions favor formation of free radicals of oxygen and nitrogen and their chemical combination as nitrogen oxides. In addition, the fuel used often contains chemically-bound nitrogen which can be converted to NO$_x$ during combustion.

A number of economically-attractive measures have been developed for many types of combustors which enable NO$_x$ to be reduced by introduction of suitable chemicals such as urea or ammonia. These materials react with the NO$_x$ and convert it into other compounds that can either be emitted or eliminated from the flue gas. Of these, selective gas phase reactions—both catalytic (SCR) and non-catalytic (SNCR)— are advantageous where they can be effectively implemented. The SNCR procedures are especially effective and economical. The catalytic processes are less desirable in many installations because they require extensive capital equipment, large spaces for installation and are subject to fouling.

However, there are also practical considerations which make the implementation of SNCR difficult in the environment of cement kilns. Attainment of consistent, high NO$_x$ reductions with SNCR procedures is a matter of considerable engineering and chemistry. These reactions occur in the gas phase (within a relatively narrow temperature, e.g., 900° to 1100° C.) and typically involve NO$_x$ levels of 200 to 1500 parts per million by volume (ppm$_v$) and either urea or ammonia at from one to three times the amount stoichiometrically required. SNCR reactions require mating of the reactive materials in high dilution, at the correct temperature, and in the gas phase.

The configuration of rotary cement kilns makes it difficult to introduce the active chemicals into the proper temperature zone. These devices comprise a rotating cylindrical chamber and can have chamber lengths on the order of one hundred meters, or more. One end, is a cold end having temperatures well below that suitable for SNCR. The other end is heated by a burner which introduces a flame centrally within the chamber, and is far too hot. The correct temperatures for NO$_x$ reduction will lie in a zone displaced considerably from the cold end, e.g., 5 to 50 meters.

If the NO$_x$-reducing agent is contacted with hot gases in the rotary kiln at a location where the temperature is too high, the NO$_x$-reducing agent will be oxidized to form additional NO$_x$. The art has employed aqueous solutions so that there is water available to protect the agent in high-temperature zones. Where the temperature in the kiln is too low, NO$_x$-reducing agent will be wasted and ammonia will be released to the atmosphere. It has not been possible to introduce aqueous solutions of NO$_x$-reducing agents into rotary cement kilns at the temperatures necessary for effective SNCR reactions.

There is a current need for a method and an apparatus which will permit the economical use of SNCR to reduce NO$_x$ emissions from cement kilns.

BACKGROUND ART

Prominent among the selective non-catalytic reduction (SNCR) processes are those disclosed for example by Lyon in U.S. Pat. No. 3,900,554 and by Arand, et al., in U.S. Pat. Nos. 4,208,386 and 4,325,924. Briefly, these patents disclose that ammonia (Lyon) and urea (Arand, et al.) can be injected into hot combustion gases to selectively react with NO$_x$ and reduce it to diatomic nitrogen and water.

The SNCR process described by Lyon in U.S. Pat. No. 3,900,554 reduces the concentration of nitrogen monoxide (NO) in combustion gases. Lyon discloses injecting ammonia or certain ammonia precursors or their aqueous solutions into an oxygen-rich waste gas for selective reaction with the nitrogen monoxide at a temperature in the range of from 870° to 1100° C. In this process, it is important that the temperature of the combustion effluent lie within a narrow "temperature window" during the contact with the gaseous ammonia. The limiting values of the window can be reduced by the addition of certain substances. Distribution of the ammonia within the combustion effluent is critical to achieving maximum utilization of the ammonia and reduction of NO within the defined temperature window. Ineffective utilization will increase costs and cause other problems associated with ammonia discharge.

Arand, et al., disclose in U.S. Pat. No. 4,208,386 that urea can be added alone or in solution to oxygen-rich effluents in a temperature range from 700° to 1100° C. Any urea which fails to react with NO$_x$ within the temperature window is, nonetheless, chemically transformed by heat and some, during cooling, results in ammonia formation. The patentees teach that the urea can be introduced as a finely-divided powder, as a fine spray in molten condition, or as a fine spray in solution form. Again, here, as with the Lyon process, distribution is critical to selective reduction and, therefore, to economic operation and avoidance of the problems associated with ammonia discharge and fouling.

Similarly, in U.S. Pat. No. 4,325,924, Arand, et al., describe an SNCR process utilizing urea in fuel-rich combustion effluents. Effluents of this type can be generated by staged combustion, which can lead to the formation of high levels of carbonaceous pollutants. Again, distribution is critical and, if ineffective, can have adverse economic as well as environmental impact.

A number of other disclosures in the field of SNCR suggest improvements over the aforementioned processes. For example, in U.S. Pat. No. 4,992,249, Bowers discloses that, for aqueous solutions of urea, if droplet size is increased and urea concentration is decreased, good results can be achieved in oxygen-rich effluents at higher temperatures than disclosed by Arand, et al. Distribution within the preferred temperature range in rotary kilns, however, cannot be achieved by aqueous solutions even with control of concentration and droplet size.

In a further modification, Bowers discloses in U.S. Pat. No. 4,719,092 that an additional material, an oxygen-containing hydrocarbon, can be injected together with an aqueous urea solution to reduce residual ammonia concentration in the effluent. Despite the added material, distribution into the proper temperature range is not practical with aqueous solutions.

In an effort to achieve better distribution by injection, DeVita describes an injector in U.S. Pat. No. 4,915,036 which shows good distribution of injected fluids while the danger of clogging is minimized. This specification discloses the need for good distribution of chemicals and enables improving it where boiler geometry permits.

Similarly, in U.S. Pat. No. 4,842,834, Burton describes an injector which, while effective in many combustor configurations, could benefit from the provision of an additive for the aqueous solutions employed which could improve droplet size distribution. And, in WO 91/17814, Chawla, et al., describe a nozzle which enables injection of a two-phase mixture of air and aqueous $NO_x$-reducing composition into an effluent at sonic velocity to achieve an improved distribution of particle sizes, but could also benefit from such an additive. The art thus, is clearly directing workers to the use of solutions and is indicating that controlling concentration and droplet size will be the answer to most distribution problems. Unfortunately, these techniques do not solve the problems posed by rotary cement kilns.

Despite the above advances, the adoption of SNCR to rotary cement kilns has not been possible with economic efficiency. The art has generally adopted the introduction of the $NO_x$-reducing agents as aqueous solutions, and these cannot be introduced with sufficient momentum to resist evaporation prior to reaching the optimum temperature window and to then fully react therein.

DISCLOSURE OF INVENTION

It is an object of the invention to provide a method for enabling the efficient use of SNCR for reducing $NO_x$ emissions from rotary cement kilns.

It is another object of the invention to provide an apparatus for enabling the efficient use of SNCR for reducing $NO_x$ emissions from rotary cement kilns.

It is yet another object of the invention to provide a method for producing cement clinker in a rotary kiln, with reduced $NO_x$ emissions.

These and other objects are achieved by the present invention which provides improved processes and apparatus.

In one aspect, the method of the invention comprises: positioning an injector, capable of propelling prills of urea at speeds of at least 25, e.g., greater than 120, meters per second, and preferably more than 50 meters per second, through hot combustion gases, into an open end of a rotary cement kiln; propelling the urea prills into the combustion gases with sufficient momentum to carry to a zone within the kiln where the temperature is within the range of from 900° to 1100° C.

In another aspect, the invention provides a process for improving the production of cement clinker in a rotary kiln having an elevated cold end and a hot end heated to a temperature of at least about 1500° C., comprising: feeding a cement premix comprising calcium carbonate and a silicious component into the cold end of the kiln; positioning an injector, capable of propelling prills of urea at speeds of at least 25, e.g., greater than 120, meters per second through hot combustion gases, into the cold end of a rotary cement kiln; propelling the urea prills into the combustion gases with sufficient momentum to carry them to a zone within the kiln where the temperature is within the range of from 900° to 1100° C.; and recovering cement clinker from the kiln.

In yet another of its aspects, the invention provides an apparatus for reducing $NO_x$ emissions from rotary cement kilns by selective noncatalytic reduction, comprising: an injector, capable of propelling prills of urea at speeds of at least 25, e.g., greater than 120, meters per second through hot combustion gases, positioned into an open end of a rotary cement kiln; means for supplying urea to said injector; and means for suppling air to said injector for propelling the urea prills into the combustion gases within the kiln with sufficient momentum to carry them to a zone within the kiln where the temperature is within the range of from 900° to 1100° C.

BRIEF DESCRIPTION OF THE DRAWING

The invention will be better understood and its advantages will become more apparent when the following detailed description is read in conjunction with the accompanying drawings, in which.

BEST MODE FOR CARRYING OUT THE INVENTION

Figure 1:
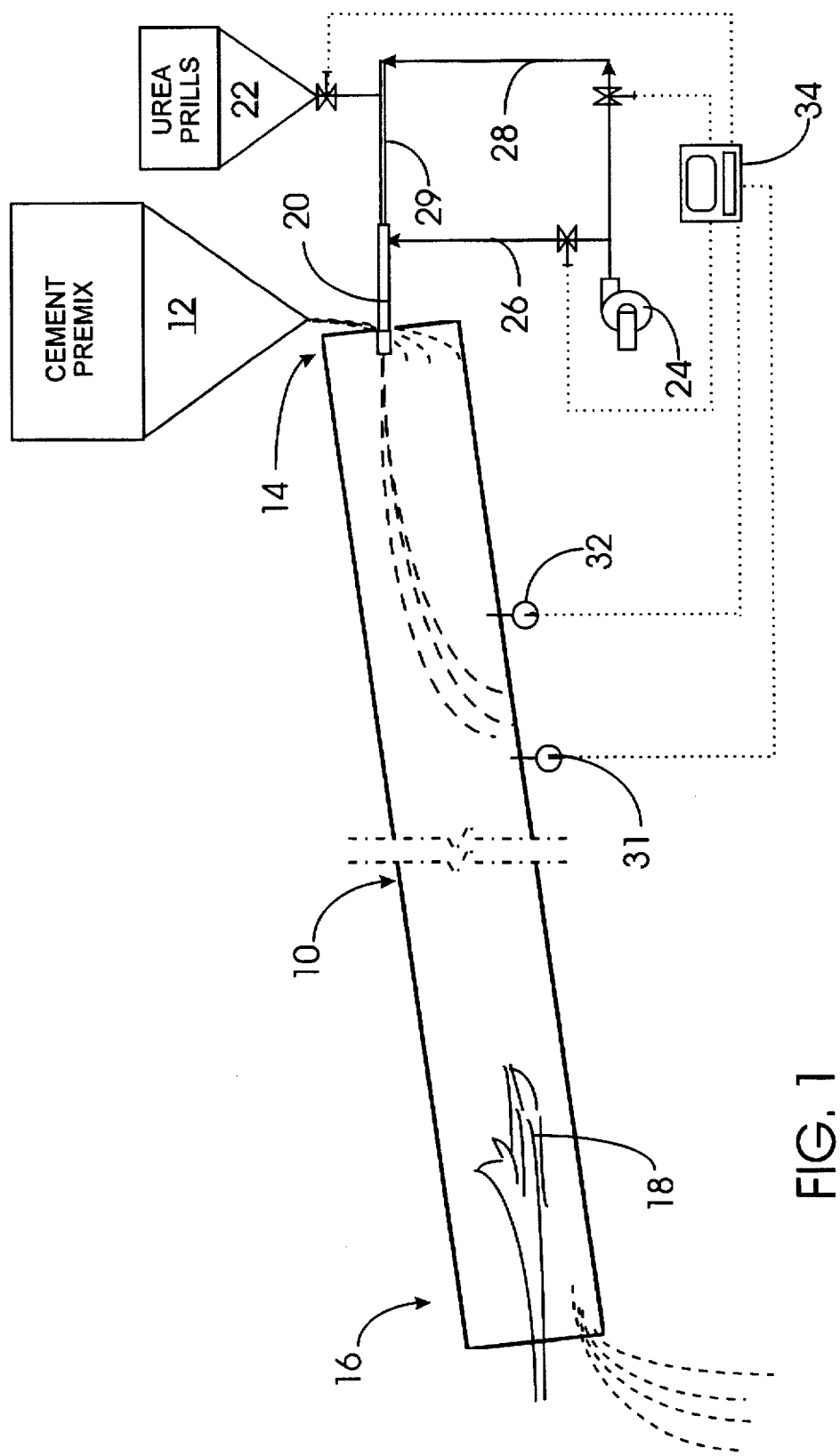
FIG. 1 is a schematic representation, foreshortened, illustrating the application of urea injection SNCR to cement kilns according to the invention.

FIG. 1 shows, in schematic form, a rotary cement kiln 10 as improved according to the invention. Hopper 12 holds a cement premix which can be of any suitable formulation. Cement is typically formed by heating an intimate mixture of calcerous and argillaceous materials to incipient fusion, and grinding the resulting clinker. There is a very wide range of materials available for this purpose, such as limestone, calcined limestone, chalk, cement rock, marls, clay, shale, slate, blast furnace slag, and the like. The proportion of materials taken is suitably adjusted to yield a mixture comprising about 75% calcium carbonate and about 25% of aluminum silicates and free silica. The exact formulation is not of important to the invention. What is important is the fact that high $NO_x$ concentrations are generated because the cement premix must be heated to extremely high temperatures to achieve the incipient fusion known to the art as necessary to form high-quality cement.

The kiln 10 is shown foreshortened at the broken lines near the middle of the illustration. Kilns of this type will typically comprise a steel cylinder lined with fire brick or other suitable refractory material and are slowly rotated (e.g., from 20 to 100 or more revolutions per hour) about an axis slightly inclined to the horizontal. Typically, these kilns will have diameters of from 2 to 4 meters and will be from about 60 to 150 meters long. Outputs can be from about 500 to about 4000 tons per day, depending on size.

The cement premix is fed into the upper end 14 of kiln 10 from hopper 12. The premix can be prepared by either a wet or dry method as known to the art, but the latter is usually employed when one or both of the materials is of a hard nature. Wet mixes are more economically processed in long kilns. The present description illustrates the processing of a wet mix, in a kiln 100 meters in length and 4 meters in diameter. The mix is mixed and agitated as it processes downwardly through the kiln toward the lower, exit end 16 on the left in the drawing. Upon discharge from the kiln, the clinker is passed to a cooler (not shown) wherein it passes its heat, by direct or indirect heat exchange, to incoming combustion air.

A burner 18 is positioned at the exit end 16 for supplying the heat necessary for the process. The preheated combustion air is introduced at this end 16. Typically, pulverized bituminous coal will be employed as the fuel, but any fuel suitable for the purpose can be employed. The temperatures in the flame zone near burner 18 will be on the order of 1700° C. and at the high (cold) end 14 will be typically less than 700° C. Therefore, the temperature at the flame end 16 will be above that necessary for urea SNCR, and at the cold end 14 the temperature will be too low. Due to the high combustion temperatures, baseline $NO_x$ concentrations will typically be above 100 ppm and, more typically are in the range of from about 300 to about 1000 ppm. The invention provides significant $NO_x$ reductions, typically from 50 to 75%.

The invention enables the use of urea SNCR by the use of urea prills and injection means effective for generating velocities at the nozzle (nozzle velocities) of greater than 10 meters per second. Injector 20 is positioned at the cold end 14 of the kiln, near its top. The injector 20 is aimed along a line above the axis of rotation of the kiln. Preferably, because the bulk linear flow of gasses in the kiln is within the range of from about 3 to about 25, e.g., typically at least 6 to 10, meters per second, and because there exists considerable drag on the individual prill particles, the nozzle velocity of the prills will desirably be at least 25, e.g., at least 100, meters per second to ensure that they reach the a distance of from 5 to 25 meters into the kiln before they drop to the rotating bed of heated cement premix in the kiln. There is no set upper limit on nozzle velocity, but it will typically be greater than 125 and less than 200 meters per second. Injectors of the type used for sand blasting, typically two phase nozzles of the converging-diverging type, can be employed successfully. One particular nozzle of this type is a 5×60 mm steel jet, made by BHS GmbH, Germany, capable of projecting urea prills at initial velocities of from 110 to 140 meters per second at flow rates of from about 20 to about 80 kilograms per hour.

Urea prills are fed to the injector from a suitable storage means, shown as hopper 22. The prills are of commercial quality, typically of a dimension of from about 1 to about 2 millimeters, e.g. 1.1 to 1.8 millimeters, weight median diameter. It is important that no more than about 10% of the particles, on a weight basis, are more than 50% less than the minimum of this size range. Also, preferably, the prills are of the coated type. Typically, they are coated with a polymer such as those having surfactant properties and as are used in the trade (and equivalents) for coating urea prills. The coating is known in the art for the purpose of anticaking. The prills can contain other materials as desired, and advantageously can contain cement premix or ground clinker in an amount of from about 5 to about 50% by weight. Where particulates of this type are included, they will preferably be ground to a particle size of from about 100 to about 400 mesh, weight average, and be incorporated with the urea in the molten form prior to forming the prills. The use of particulates of this type is advantageous for the purpose of keeping the nozzle clean, i.e., acting as an abrasive, and increasing the prill density, thus increasing the momentum and penetration of the injected prills.

Compressed air is provided by pump or compressor 24 and is supplied through suitable conduits such as 26 and 28. Conduit 29 will provide air at a suitable pressure and rate to convey prills from hopper 22 to the injector 20, and conduit 26 will provide air at a suitable pressure and rate to the injector nozzle to supply the propelling force to the prills. It is desired to be able to propel the prills to provide at least 75% of them falling within a zone of from 3 to 5 meters in axial extent. Preferably, at least 90% of the prills with fall within this axial zone.

Preferably, means are provided for determining the temperature at various points within the kiln. For example, each of sensors 31 and 32, which can be thermocouples, can be employed to generate a signal representative of the temperature at its location. The generated signals can then be transmitted to a suitable controller 34 or other device capable of comparing the signal to a reference signal and generating a control signal in response to the comparison. The control signal is then transmitted to operate valves or other metering devices to control the feed of compressed air through lines 26 and 28 and urea prills from source 20.

The urea is fed into the kiln at a rate sufficient to supply urea nitrogen to that bound in the $NO_x$ at molar ratio (known in the art as the normalized stoichiometric ratio, NSR) of from 0.5:1 to about 3:1, typically from about 1:1 to about 2:1. The urea should not be used at levels which will create ammonia slip values of greater than about 25 ppm, and preferably the ammonia slip will be kept to less than about 15 ppm. Some degree of ammonia slip is desired when electrostatic precipitators are employed downstream of the kiln because the ammonia can aid the operation of these devices.

The cement clinker is recovered from the low end 14 of the kiln, cooled as noted above and ground to suitable particle size as known in the art.

The following example is provided to further explain and illustrate the invention and some of its advantages, but are not to be taken as limiting in any regard. Unless otherwise indicated, all percentages are by weight.

EXAMPLE

A cement premix comprising 75% calcined limestone and 25% slate clay is milled in an impact pulverizer to achieve a powdered, milled premix. The milled premix is then fed to a rotary kiln at a rate of 40 tons per hour. The kiln is of the rotary type, being about 100 meters in length and 4 meters in diameter. The kiln is rotated at a rate of about 100 revolutions per hour about an inclined axis and has a vertical drop of about 5 meters from high end to low end. At the lower end, pulverized coal is burned by a 2-channel-type burner as air preheated to about 500° C. is supplied at about a 13% (by weight) excess. Coal is used at a rate sufficient to supply about 3000 BTU's per ton of cement premix. The cement premix is heated as it flows counter currently with the hot combustion gases being generated by the burner.

The temperature of the combustion gases just downstream of the burner is about 1700° C. The baseline $NO_x$ is measured as 550 ppm. The temperature at the cold end of the kiln, the end where the cement premix is fed, is about 700°–800° C. A temperature of about 1000° C. is located in a zone about 10–20 meters inward of the kiln.

Urea is supplied to a venturi-type injector and propelled at an initial velocity of about 140 meters per second. The urea prills have a weight median diameter of about 1.6 millimeters, and are of the spherical type, being coated with a surfactant. The urea prills travel into the kiln with about 90% falling with a zone located from 9 to 12 meters from the point of injection. The urea is supplied at an NSR of about 1. The $NO_x$ concentration is reduced by 75% to 140 ppm.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims. The claims are meant to cover the claimed components and steps in any sequence which is effective to meet the objectives there intended, unless the context specifically indicates the contrary.

I claim:

1. A process for reducing $NO_x$ emissions present in a rotary cement kiln containing combustion gases by selective noncatalytic reduction, comprising injecting prills of urea at a speed of at least 25 meters per second into an open end of a rotary cement kiln with sufficient momentum to carry said prills through said combustion gases to a zone within the kiln where the temperature is within the range of from 900° to 1100° C.; and reducing nitrogen oxides present in said combustion gases.

2. A process according to claim 1 wherein the baseline $NO_x$ concentration in said combustion gases is within the range of from about 300 to about 1000 ppm and is reduced by at least 50%.

3. A process according to claim 1 wherein the prills are propelled to provide at least 75% of them falling within a zone of from 3 to 5 meters in axial extent within the rotary kiln.

4. A process according to claim 1 wherein the nozzle velocity of the prills is at least 25 meters per second to ensure that the prills reach a distance of from 5 to 25 meters into the kiln before they drop to the rotating bed of heated cement premix in the kiln.

* * * * *